(12) United States Patent
Ando

(10) Patent No.: US 11,429,229 B2
(45) Date of Patent: Aug. 30, 2022

(54) IMAGE PROCESSING APPARATUS AND DISPLAY APPARATUS WITH DETECTION FUNCTION

(71) Applicant: SONY GROUP CORPORATION, Tokyo (JP)

(72) Inventor: Masahiro Ando, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/413,816

(22) PCT Filed: Nov. 22, 2019

(86) PCT No.: PCT/JP2019/045724
§ 371 (c)(1),
(2) Date: Jun. 14, 2021

(87) PCT Pub. No.: WO2020/129536
PCT Pub. Date: Jun. 25, 2020

(65) Prior Publication Data
US 2022/0019301 A1    Jan. 20, 2022

(30) Foreign Application Priority Data

Dec. 20, 2018 (JP) .............................. JP2018-237899

(51) Int. Cl.
*G06F 3/042* (2006.01)
*G06V 20/00* (2022.01)
*G09G 3/00* (2006.01)

(52) U.S. Cl.
CPC .............. *G06F 3/042* (2013.01); *G06V 20/00* (2022.01); *G09G 3/002* (2013.01); *G06F 3/0425* (2013.01);
(Continued)

(58) Field of Classification Search
CPC ...... G06F 3/042; G06F 3/0425; G06F 3/0426; G06V 20/00; G06V 10/143; G06V 10/145;
(Continued)

(56) References Cited

U.S. PATENT DOCUMENTS

2002/0011987 A1   1/2002   Kitazawa
2011/0033088 A1*  2/2011   Rekimoto ............. G06F 3/0425
                                                        382/107
(Continued)

FOREIGN PATENT DOCUMENTS

CA    2862470 A1    7/2013
CN    103299259 A   9/2013
(Continued)

OTHER PUBLICATIONS

International Search Report and Written Opinion of PCT Application No. PCT/JP2019/045724, dated Dec. 24, 2019, 09 pages of ISRWO.

*Primary Examiner* — Adam R. Giesy
(74) *Attorney, Agent, or Firm* — Chip Law Group

(57) ABSTRACT

An image processing apparatus according to the present disclosure includes: a position detection illumination unit; an image recognition illumination unit; an illumination control unit; an imaging unit; and an image processing unit. The position detection illumination unit outputs position detection illumination light. The position detection illumination light is used for position detection on a position detection object. The image recognition illumination unit outputs image recognition illumination light. The image recognition illumination light is used for image recognition on an image recognition object. The illumination control unit controls the position detection illumination unit and the image recognition illumination unit to cause the position detection illumination light and the image recognition illumination light to be outputted at timings different from each other. The position detection illumination light and the image recognition illumination light enter the imaging unit at timings different from each other. The image processing unit determines switching between the position detection illumination light and the image recognition illumination light on the basis of luminance information regarding a captured image by the imaging unit. The image processing unit performs position detection on the position detection object on the basis of an imaging result of the imaging unit with the position detection illumination light switched on and performs image recognition on the image recognition (Continued)

object on the basis of an imaging result of the imaging unit with the image recognition illumination light switched on.

10 Claims, 11 Drawing Sheets

(52) U.S. Cl.
CPC ....... *G06F 3/0426* (2013.01); *G09G 2354/00* (2013.01)

(58) Field of Classification Search
CPC ............... G06V 40/1318; G09G 3/002; G09G 2354/00; G03B 21/00; G03B 21/14
See application file for complete search history.

(56) References Cited

U.S. PATENT DOCUMENTS

| | | |
|---|---|---|
| 2013/0314380 A1 | 11/2013 | Kuribayashi |
| 2014/0313166 A1 | 10/2014 | Rattray et al. |
| 2016/0196005 A1* | 7/2016 | Kaneda ................ H04N 9/3141 353/20 |
| 2016/0282968 A1 | 9/2016 | Henninen et al. |

FOREIGN PATENT DOCUMENTS

| | | |
|---|---|---|
| CN | 106020511 A | 10/2016 |
| EP | 2687959 A1 | 1/2014 |
| JP | 2001-344069 A | 12/2001 |
| JP | 2012-208926 A | 10/2012 |
| JP | 2013-196475 A | 9/2013 |
| JP | 2016-186674 A | 10/2016 |
| JP | 2017-021861 A | 1/2017 |
| WO | 2012/124730 A1 | 9/2012 |
| WO | 2013/104061 A1 | 7/2013 |
| WO | 2018/051886 A1 | 3/2018 |

* cited by examiner

[FIG. 1]
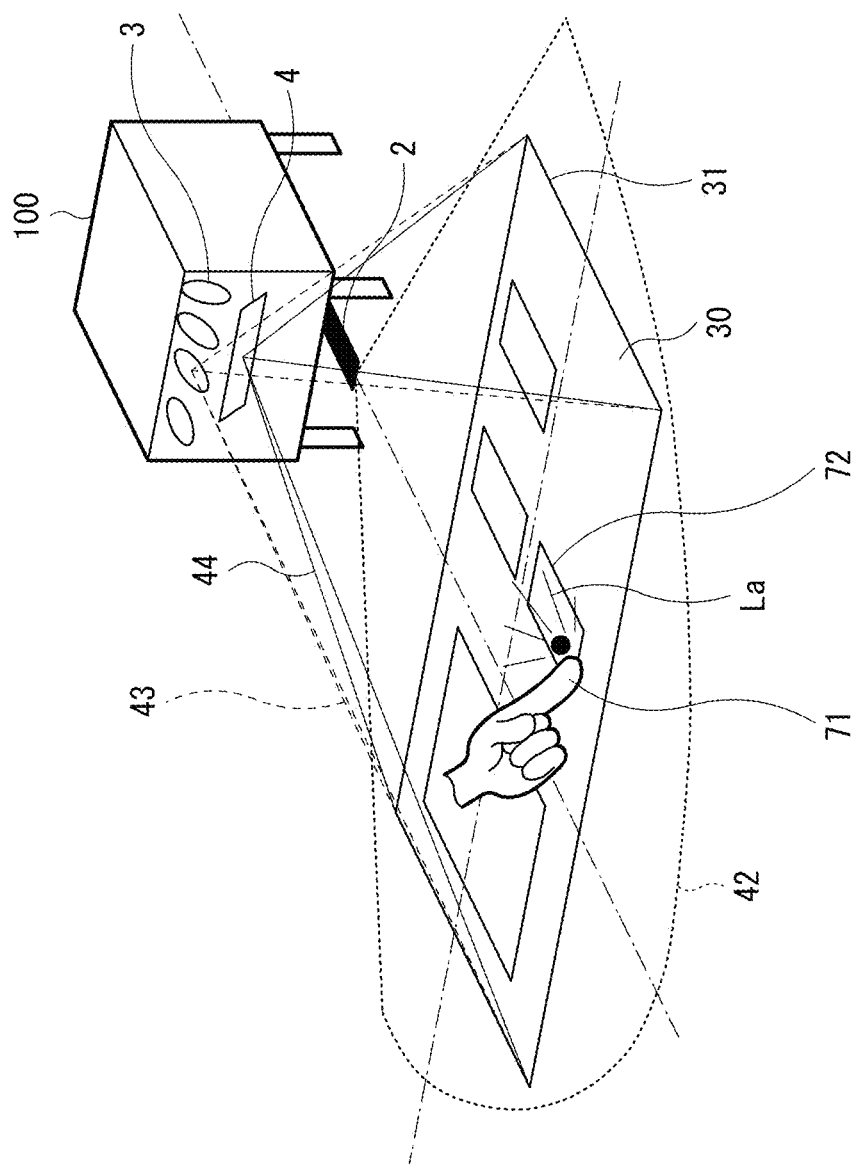

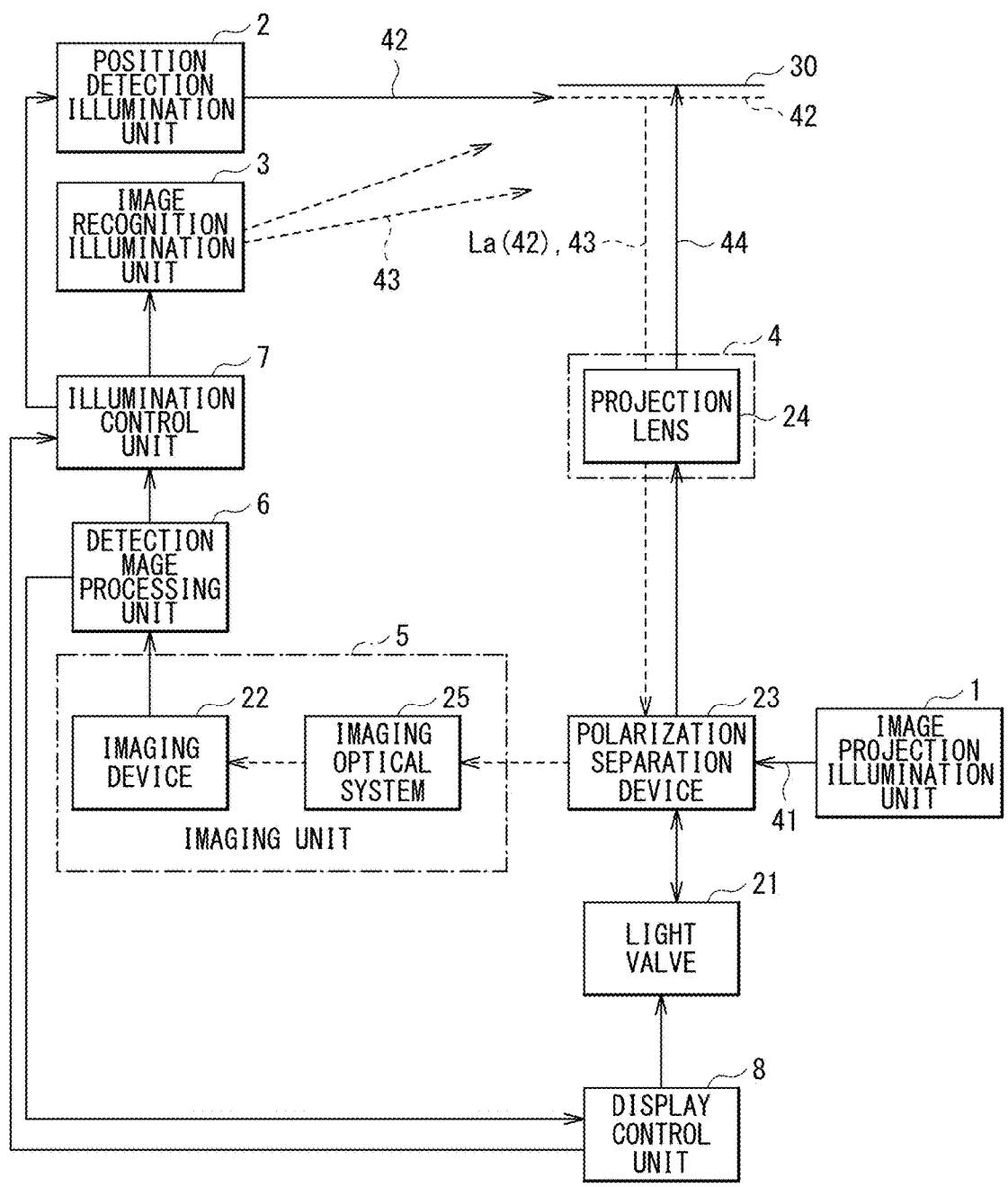
[FIG. 2]

[FIG. 3]
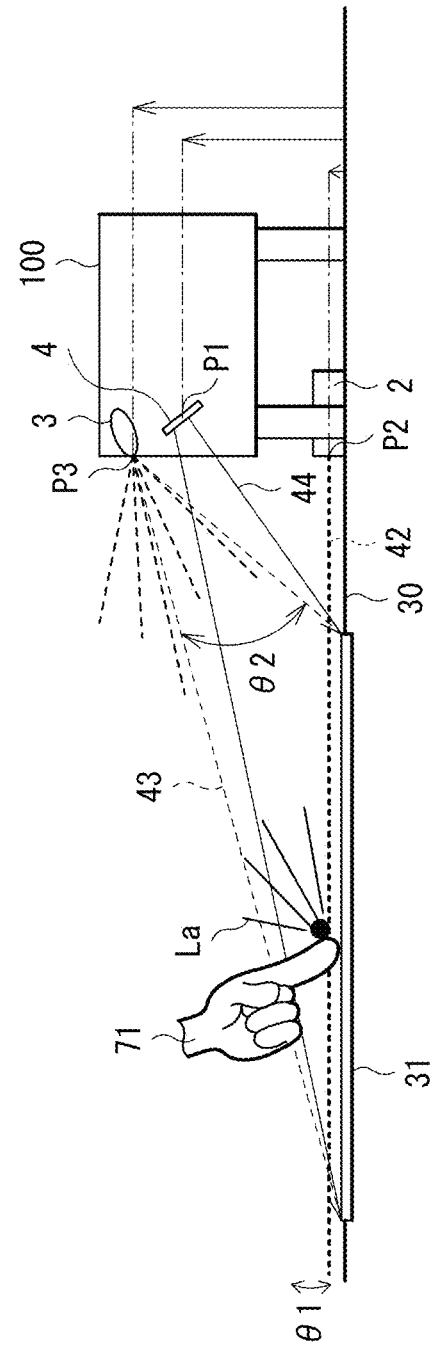

[FIG. 4]
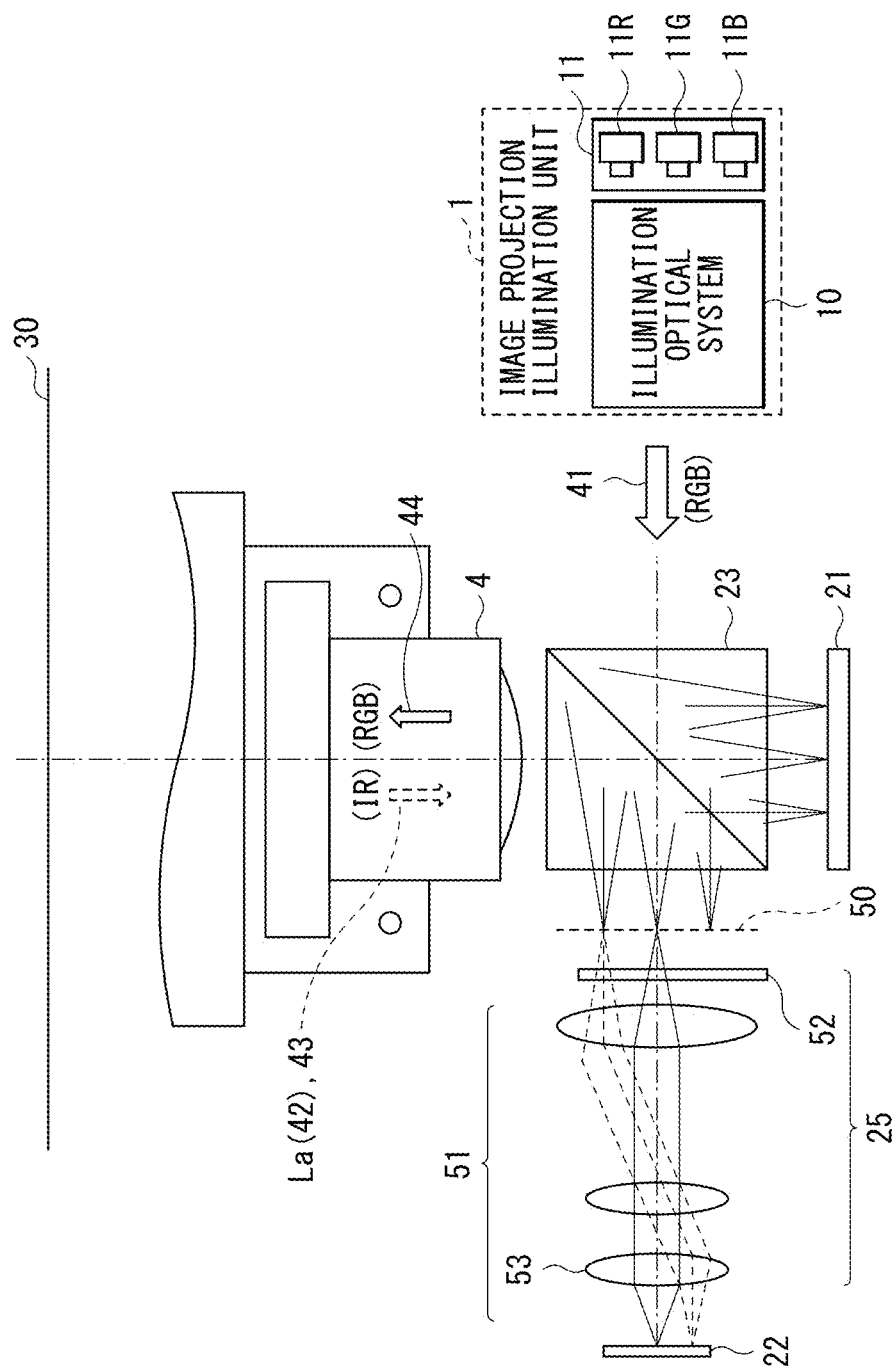

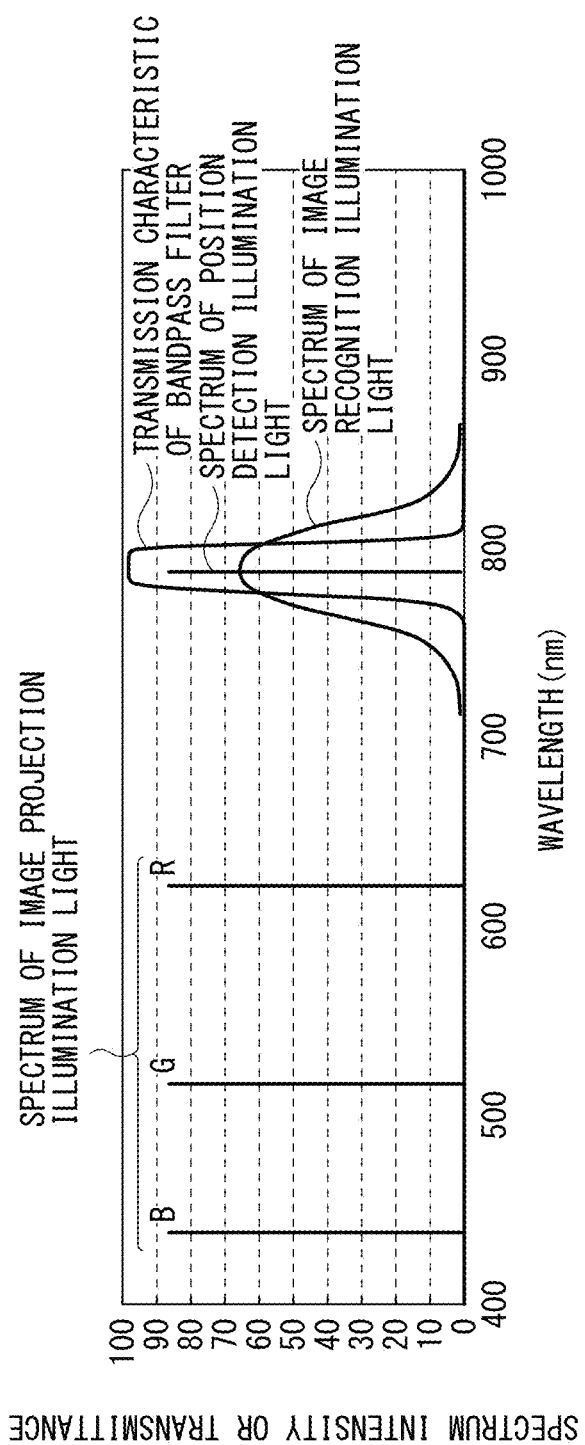
[FIG. 5]

[FIG. 6]
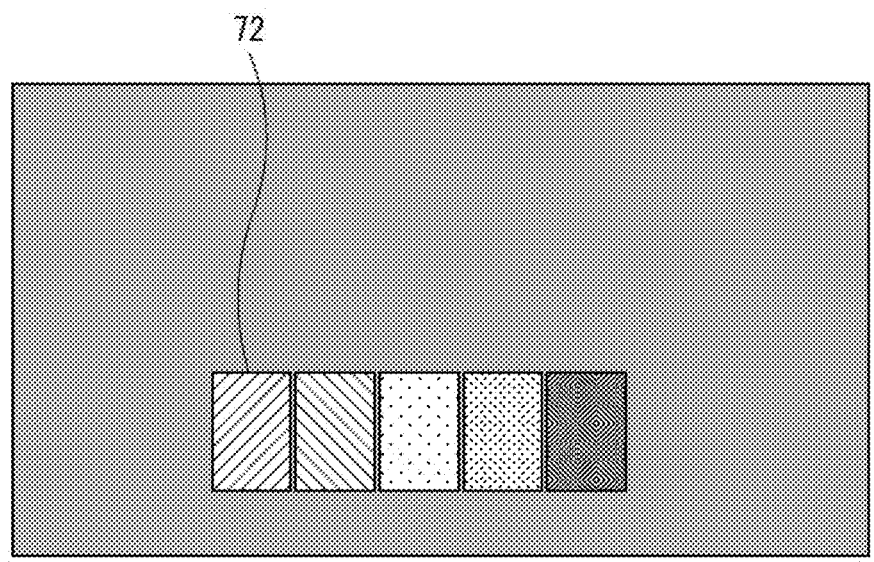

[FIG. 7]
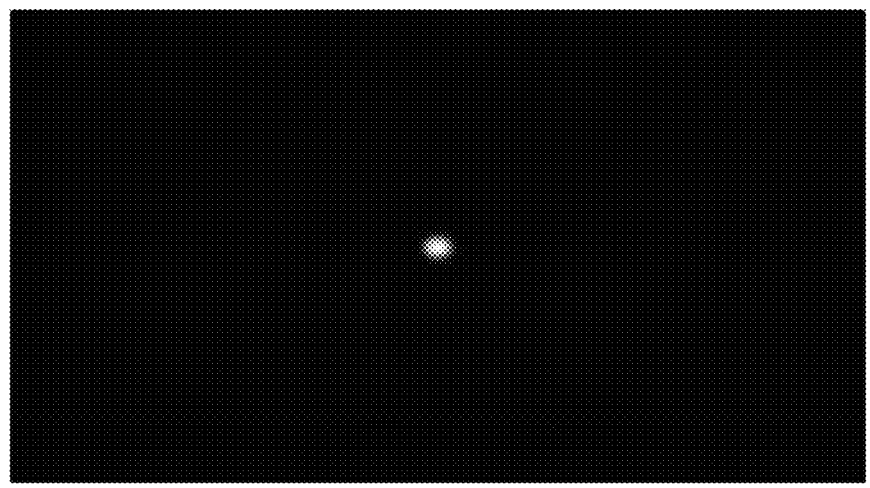

[FIG. 8]
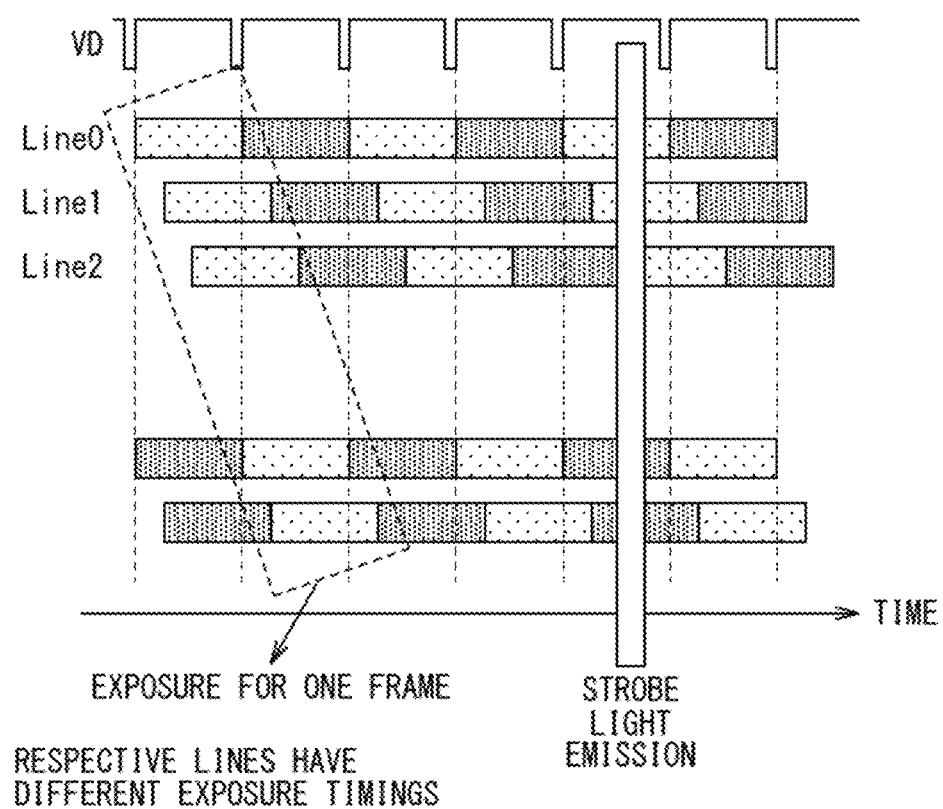

[FIG. 9]
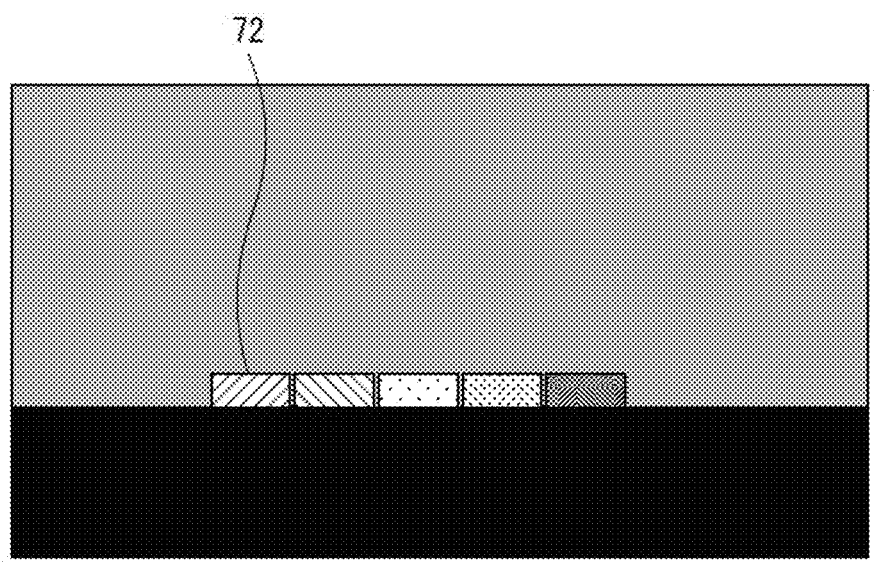

[FIG. 10]
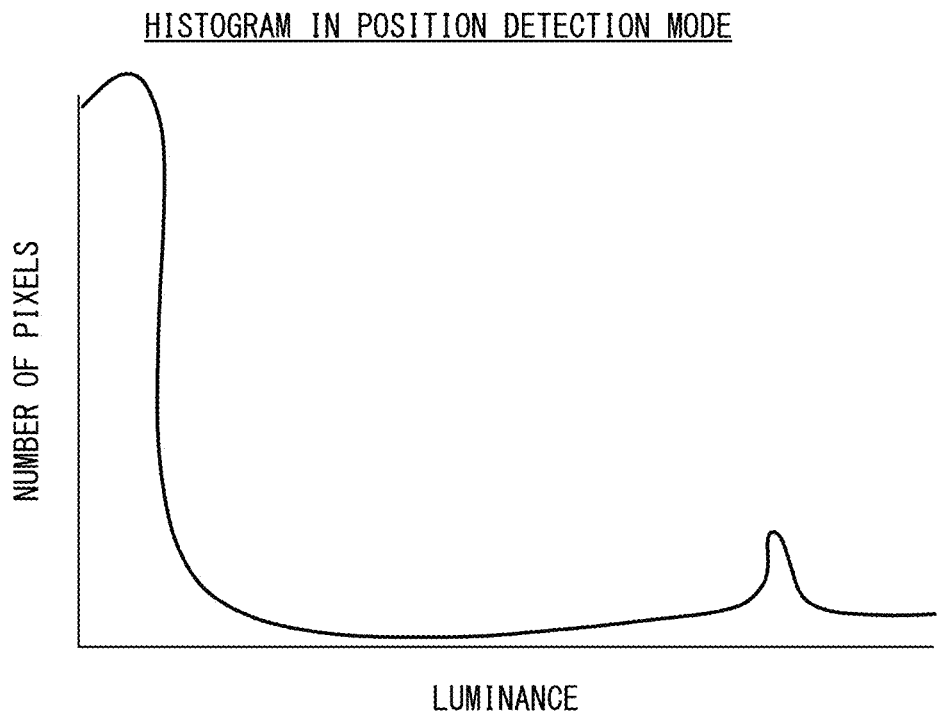
[FIG. 11]
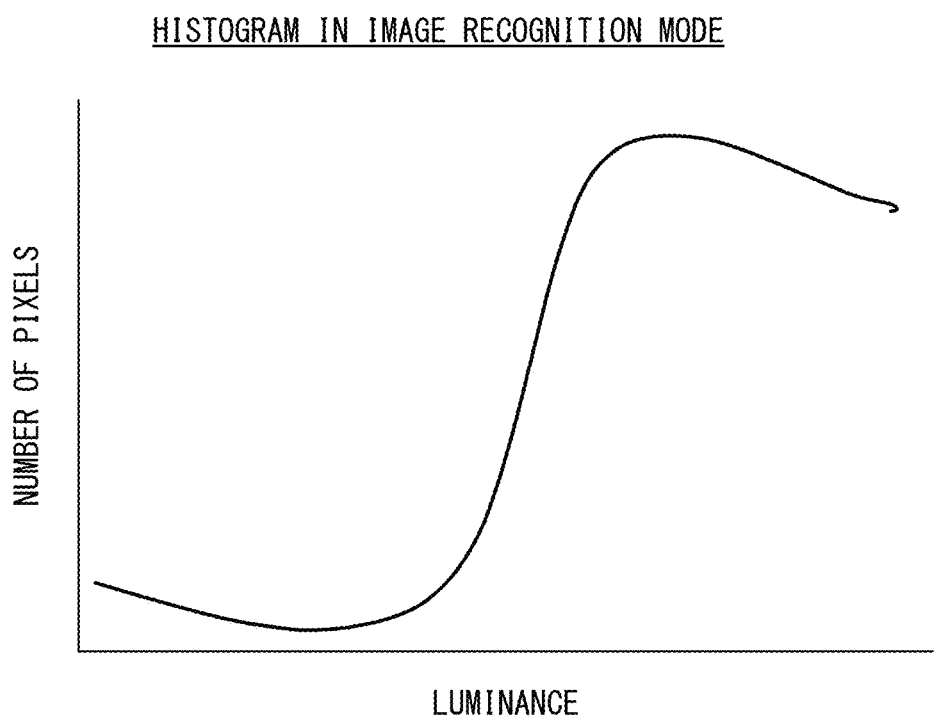

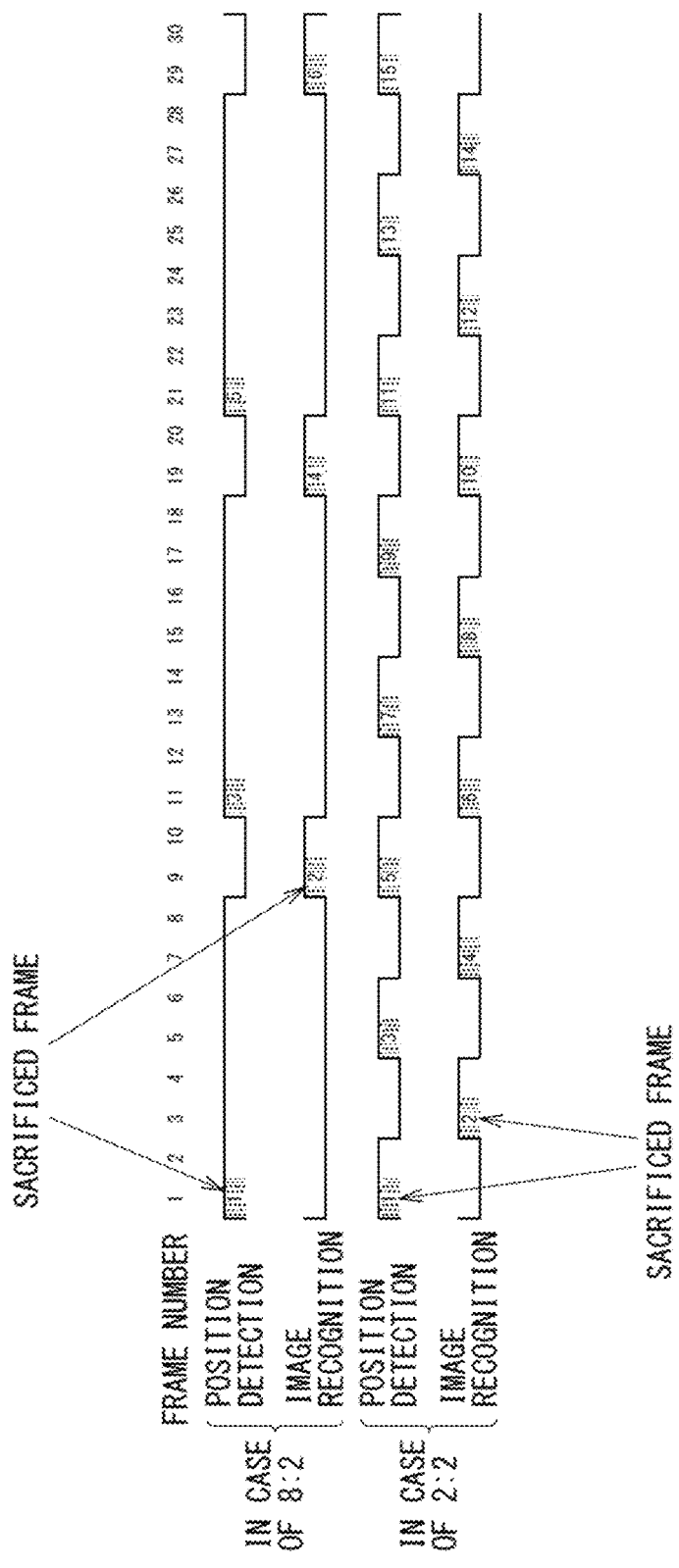

IMAGE PROCESSING APPARATUS AND DISPLAY APPARATUS WITH DETECTION FUNCTION

CROSS REFERENCE TO RELATED APPLICATIONS

This application is a U.S. National Phase of International Patent Application No. PCT/JP2019/045724 filed Nov. 22, 2019, which claims priority benefit of Japanese Patent Application No. JP 2018-237899 filed in the Japan Patent Office on Dec. 20, 2018. Each of the above-referenced applications is hereby incorporated herein by reference in its entirety.

TECHNICAL FIELD

The present disclosure relates to an image processing apparatus and a display apparatus with a detection function each of which performs position detection and image recognition.

BACKGROUND ART

A display apparatus with a detection function is proposed that is a projector serving as a display apparatus (see PTL 1). The projector has a touch detection (position detection) function of detecting the position of a finger or the like on a projection surface of an image and an image recognition function of performing image recognition on a card, a medium, or the like on the projection surface. This display apparatus with the detection function performs position detection and image recognition on the basis of an imaging result obtained by performing imaging, for example, by switching between position detection illumination light and image recognition illumination light as appropriate.

CITATION LIST

Patent Literature

PTL 1: International Publication No. WO 2018/051886

SUMMARY OF THE INVENTION

System latency or the like may sometimes cause the display apparatus with the detection function described above to fail to accurately determine the timing to actually switch between the position detection illumination light and the image recognition illumination light. This increases useless waiting time and decreases the real time properties of position detection and image recognition.

It is desirable to provide an image processing apparatus and a display apparatus with a detection function each of which makes it possible to increase the real time properties of position detection and image recognition.

An image processing apparatus according to an embodiment of the present disclosure includes: a position detection illumination unit; an image recognition illumination unit; an illumination control unit; an imaging unit; and an image processing unit. The position detection illumination unit outputs position detection illumination light. The position detection illumination light is used for position detection on a position detection object. The image recognition illumination unit outputs image recognition illumination light. The image recognition illumination light is used for image recognition on an image recognition object. The illumination control unit controls the position detection illumination unit and the image recognition illumination unit to cause the position detection illumination light and the image recognition illumination light to be outputted at timings different from each other. The position detection illumination light and the image recognition illumination light enter the imaging unit at timings different from each other. The image processing unit determines switching between the position detection illumination light and the image recognition illumination light on the basis of luminance information regarding a captured image by the imaging unit. The image processing unit performs position detection on the position detection object on the basis of an imaging result of the imaging unit with the position detection illumination light switched on and performs image recognition on the image recognition object on the basis of an imaging result of the imaging unit with the image recognition illumination light switched on.

A display apparatus with a detection function according to an embodiment of the present disclosure includes: an image projection illumination unit; a light valve; a position detection illumination unit; an image recognition illumination unit; an illumination control unit; an imaging unit; and an image processing unit. The image projection illumination unit outputs image projection illumination light. The light valve modulates the image projection illumination light on the basis of image data and generates image light. The position detection illumination unit outputs position detection illumination light. The position detection illumination light is used for position detection on a position detection object. The image recognition illumination unit outputs image recognition illumination light. The image recognition illumination light is used for image recognition on an image recognition object. The illumination control unit controls the position detection illumination unit and the image recognition illumination unit to cause the position detection illumination light and the image recognition illumination light to be outputted at timings different from each other. The position detection illumination light and the image recognition illumination light enter the imaging unit at timings different from each other. The image processing unit determines switching between the position detection illumination light and the image recognition illumination light on the basis of luminance information regarding a captured image by the imaging unit. The image processing unit performs position detection on the position detection object on the basis of an imaging result of the imaging unit with the position detection illumination light switched on and performs image recognition on the image recognition object on the basis of an imaging result of the imaging unit with the image recognition illumination light switched on.

The image processing apparatus or the display apparatus with the detection function according to the respective embodiments of the present disclosure each determine the switching between the position detection illumination light and the image recognition illumination light on the basis of the luminance information regarding the captured image by the imaging unit. The image processing unit performs the position detection on the position detection object on the basis of the imaging result of the imaging unit with the position detection illumination light switched on and performs the image recognition on the image recognition object on the basis of the imaging result of the imaging unit with the image recognition illumination light switched on.

BRIEF DESCRIPTION OF DRAWING

FIG. 1 is a configuration diagram schematically illustrating an example of a display apparatus with a detection function according to a first embodiment of the present disclosure.

FIG. 2 is a block diagram schematically illustrating a functional configuration example of the display apparatus with the detection function according to the first embodiment.

FIG. 3 is a configuration diagram schematically illustrating a configuration example of the display apparatus with the detection function according to the first embodiment as viewed from a lateral direction.

FIG. 4 is a configuration diagram schematically illustrating a configuration example of an imaging unit in the display apparatus with the detection function according to the first embodiment.

FIG. 5 is an explanatory diagram illustrating an example of spectra of pieces of illumination light and a transmission characteristic of a bandpass filter of the imaging unit in the display apparatus with the detection function according to the first embodiment.

FIG. 6 is an explanatory diagram schematically illustrating an example of an imaging result of an image recognition object.

FIG. 7 is an explanatory diagram schematically illustrating an example of an imaging result of a position detection object.

FIG. 8 is an explanatory diagram illustrating an example of an exposure timing of an imaging device having a rolling shutter method.

FIG. 9 is an explanatory diagram schematically illustrating an example of a captured image in switching between position detection illumination light and image recognition illumination light in a case where imaging is performed in the rolling shutter method.

FIG. 10 is an explanatory diagram illustrating an example of a histogram of luminance distribution of a captured image in a position detection mode.

FIG. 11 is an explanatory diagram illustrating an example of a histogram of luminance distribution of a captured image in an image recognition mode.

FIG. 12 is a timing chart illustrating an example of a timing of switching between the position detection illumination light and the image recognition illumination light.

MODES FOR CARRYING OUT THE INVENTION

The following describes embodiments of the present disclosure in detail with reference to the drawings. It is to be noted that description is given in the following order.
0. Comparative Example
1. First Embodiment (FIGS. 1 to 12)
1.1 Configuration
1.2 Operation
1.3 Effects
2. Other Embodiments

0. Comparative Example

Overview and Issues of Display Apparatus with Detection Function According to Comparative Example An overview and an issue of a display apparatus with a detection function proposed in PTL 1 (International Publication No. WO 2018/051886) are described as a comparative example. The display apparatus with the detection function according to this comparative example performs position detection and image recognition on the basis of an imaging result obtained by performing imaging, for example, by switching between position detection illumination light and image recognition illumination light as appropriate. System latency or the like may sometimes cause the display apparatus with the detection function according to this comparative example to fail to accurately determine the switching timing to actually switch between the position detection illumination light and the image recognition illumination light. For example, the longest waiting time possible for the system may be therefore inserted and the illumination light switching may be considered to be completed. However, in this case, useless waiting time increases and the real time properties of the position detection and the image recognition decrease.

In addition, PTL 1 proposes a method that makes it possible to concurrently perform position detection and image recognition by adopting different wavelengths for illumination light for position detection and illumination light for image recognition and structuring two imaging devices to separately image the respective wavelengths. This method, however, requests two imaging devices. This increases the size of the apparatus. The merit of portability is lost as compared with a case where one imaging device performs position detection and image recognition. In addition, this also increases cost.

In addition, PTL 1 proposes a method that allows one imaging device to concurrently perform position detection and image recognition by adopting different wavelengths for illumination light for position detection and illumination light for image recognition and separately providing a light receiving region for position detection and a light receiving region for image recognition. This method, however, shares the pixels of one imaging device between position detection and image recognition in half. This reduces the resolution to ½ and makes it difficult to obtain sufficient imaging performance.

Accordingly, it is desirable to develop technology that allows the real time properties of position detection and image recognition to increase without causing the use of two imaging devices to complicate or enlarge the apparatus and without reducing the resolution of a captured image to ½.

In the following first embodiment, an example is described in which an image processing apparatus according to the present technology is applied to a projector serving as a display apparatus with a detection function.

1. First Embodiment

1.1 Configuration

FIG. 1 schematically illustrates a configuration example of a display apparatus with a detection function according to a first embodiment of the present disclosure. FIG. 2 schematically illustrates a functional configuration example of the display apparatus with the detection function. FIG. 3 schematically illustrates a configuration example of the display apparatus with the detection function as viewed from a lateral direction. FIG. 4 schematically illustrates a configuration example of an imaging unit 5 in the display apparatus with the detection function. FIG. 5 illustrates an example of the spectra of a plurality of pieces of illumination light and the transmission characteristic of a bandpass filter 52 of the imaging unit 5. The plurality of pieces of illumination light and the bandpass filter 52 are used for the display apparatus with the detection function.

The display apparatus with the detection function according to the first embodiment has a function as a projector that projects an image onto a projection surface 30, a touch detection (position detection) function that detects, for example, the position or motion of a position detection object 71 such as a finger of a person on the projection surface 30, and a function of performing image recognition on an image recognition object 72 such as a card or a medium on the projection surface 30. A card serving as the image recognition object 72 may be, for example, a card such as a trading card used for a game. A medium serving as the image recognition object 72 may be a package medium such as CD (Compact Disc) (registered trademark), DVD (Digital Versatile Disc) (registered trademark), and BD (Blu-ray Disc) (registered trademark).

It is to be noted that the projection surface 30 may be a projection screen. In addition, the projection surface 30 may be a surface of a desk, a floor surface, or the like. In addition, the projection surface 30 may be a wall surface or the like.

As illustrated in FIGS. 1 and 2, the display apparatus with the detection function according to the first embodiment includes an image projection illumination unit 1, a position detection illumination unit 2, an image recognition illumination unit 3, a projection optical system 4, the imaging unit 5, a detection image processing unit 6, an illumination control unit 7, and a display control unit 8. The display apparatus with the detection function according to the first embodiment further includes a light valve 21 and a polarization separation device 23.

The image projection illumination unit 1 outputs image projection illumination light 41. The light valve 21 is illuminated with the image projection illumination light 41 that is outputted from the image projection illumination unit 1 via the polarization separation device 23.

As illustrated in FIG. 4, the image projection illumination unit 1 includes an illumination optical system 10 and a light source section 11. For example, as illustrated in FIG. 5, the light source section 11 includes laser light sources that output pieces of light having red (R), green (G), and blue (B) spectra. The light source section 11 includes, for example, a blue laser 11B that emits B light, a green laser 11G that emits G light, and a red laser 11R that emits R light. The light emission from each of the red laser 11R, the green laser 11G, and the blue laser 11B may be controlled, for example, in accordance with a field sequential method by an emission control unit that is not illustrated.

The illumination optical system 10 generates the pieces of image projection illumination light 41 having R, G, and B spectra on the basis of light from the light source section 11. The illumination optical system 10 may include a condenser lens that condenses respective pieces of color light from the light source section 11, a light equalizing member that equalizes the respective pieces of color light, a light path synthesizing member that synthesizes light paths of the respective colors, and the like.

The light valve 21 modulates the image projection illumination light 41 on the basis of image data supplied from the display control unit 8 and generates image light 44. The light valve 21 is, for example, a reflective liquid crystal device such as LCOS (Liquid Crystal On Silicon). The image light 44 generated by the light valve 21 is projected onto the projection surface 30 via the polarization separation device 23 and the projection optical system 4.

The position detection illumination unit 2 outputs position detection illumination light 42 used for position detection on the position detection object 71 on the projection surface 30. The position detection illumination unit 2 is provided, for example, at the lower portion of a main body 100. The position detection illumination unit 2 outputs the position detection illumination light 42 to cover at least a projection area 31 of the image light 44 on the projection surface 30 with the position detection illumination light 42 from a predetermined height.

The image recognition illumination unit 3 outputs image recognition illumination light 43 used for image recognition on the image recognition object 72 on the projection surface 30. The image recognition illumination unit 3 illuminates at least a region including the projection area 31 of the image light 44 on the projection surface 30 with the image recognition illumination light 43.

For example, as illustrated in FIG. 5, the wavelength bands of the position detection illumination light 42 and the image recognition illumination light 43 are different from the wavelength band of the image projection illumination light 41. In addition, the center wavelength of the position detection illumination light 42 and the center wavelength of the image recognition illumination light 43 are substantially the same.

As illustrated in FIG. 5, for example, the wavelength band of the image projection illumination light 41 falls within the visible range. The wavelength bands of the position detection illumination light 42 and the image recognition illumination light 43 fall within the near-infrared range. The position detection illumination unit 2 and the image recognition illumination unit 3 each include, for example, a near-infrared light source. It is desirable that the wavelength band of the image recognition illumination light 43 be wider, for example, than the wavelength band of the position detection illumination light 42.

The illumination control unit 7 controls the position detection illumination unit 2 to switch on (output) and off (non-output) the position detection illumination light 42 and controls the image recognition illumination unit 3 to switch on (output) and off (non-output) the image recognition illumination light 43.

The illumination control unit 7 controls the position detection illumination unit 2 and the image recognition illumination unit 3 to cause the position detection illumination light 42 and the image recognition illumination light 43 to be outputted at timings different from each other. In a position detection mode in which the detection image processing unit 6 performs position detection on the position detection object 71, the illumination control unit 7 controls the position detection illumination unit 2 and the image recognition illumination unit 3 to cause only the position detection illumination light 42 among the position detection illumination light 42 and the image recognition illumination light 43 to be outputted. In addition, in an image recognition mode in which the detection image processing unit 6 performs image recognition on the image recognition object 72, the illumination control unit 7 controls the position detection illumination unit 2 and the image recognition illumination unit 3 to cause only the image recognition illumination light 43 among the position detection illumination light 42 and the image recognition illumination light 43 to be outputted.

It is desirable that the illumination control unit 7 control the position detection illumination unit 2 and the image recognition illumination unit 3 to cause the illumination period of the position detection illumination light 42 to be longer than the illumination period of the image recognition illumination light 43. In addition, it is desirable that the illumination control unit 7 control the position detection illumination unit 2 to cause the position detection illumination light 42 to be outputted over the period of at least three frames.

The detection image processing unit 6 is an image processing unit that performs position detection on the position detection object 71 and image recognition on the image recognition object 72 on the basis of an imaging result of the imaging unit 5. For example, the detection image processing unit 6 analyzes a detection signal from the imaging unit 5 and acquires positional data (coordinate data) of a detected object. The detection image processing unit 6 may have a function of analyzing not only the position of the position detection object 71, but also the movement of the position detection object 71 such as gesture motion.

The detection image processing unit 6 determines the switching between the position detection illumination light 42 and the image recognition illumination light 43 on the basis of luminance information regarding a captured image by the imaging unit 5. The detection image processing unit 6 performs position detection on the position detection object 71 on the basis of an imaging result of the imaging unit 5 with the position detection illumination light 42 switched on. In addition, the detection image processing unit 6 performs image recognition on the image recognition object 72 on the basis of an imaging result of the imaging unit 5 with the image recognition illumination light 43 switched on.

The detection image processing unit 6 determines the switching between the position detection illumination light 42 and the image recognition illumination light 43, for example, on the basis of a histogram of the luminance distribution of a captured image. This technique of causing the detection image processing unit 6 to determine the switching between the position detection illumination light 42 and the image recognition illumination light 43 is described below in detail.

The image data supplied from the display control unit 8 may include image data including information relevant to an image of the image recognition object 72 recognized by the detection image processing unit 6.

The projection optical system 4 includes a projection lens 24 as illustrated in FIG. 2. The projection lens 24 may be an ultra-short focus lens. The projection optical system 4 has a function as an image-forming optical system for position detection and image recognition in addition to the function of projecting an image. The image light 44 generated by the light valve 21 enters the projection optical system 4. In addition, the projection optical system 4 takes in the image recognition illumination light 43 and scattered light La of the position detection illumination light 42 caused by the position detection object 71 from the projection surface 30 side.

The imaging unit 5 includes an imaging device 22 and an imaging optical system 25. The position detection illumination light 42 and the image recognition illumination light 43 enter the imaging unit 5 at timings different from each other.

The imaging device 22 includes a solid-state imaging device such as CMOS (Complementary Metal-Oxide Semiconductor) or CCD (Charge Coupled Device). The imaging device 22 is disposed at an optically conjugate position with the projection surface 30. In addition, the imaging device 22 is disposed at an optically conjugate position with the light valve 21. More specifically, in a case where the light valve 21 is a reflective liquid crystal device, the display surface (liquid crystal surface) that produces an image and the imaging surface of the imaging device 22 are disposed at optically conjugate positions with each other. The scattered light La of the position detection illumination light 42 and the image recognition illumination light 43 enter the imaging device 22 via the projection optical system 4 and the polarization separation device 23. The imaging device 22 allows for imaging by using at least substantially the same area as the projection area 31 on the projection surface 30 as an imaging area.

As illustrated in FIG. 4, the imaging optical system 25 is disposed between an optically conjugate plane 50 of the light valve 21 and the imaging device 22. For example, as illustrated in FIG. 4, the imaging optical system 25 includes a reduction optical system 51 including a plurality of relay lenses 53 and the bandpass filter 52.

The disposition of the reduction optical system 51 including the relay lenses 53 makes it possible to set the optically conjugate position with the light valve 21 farther than the conjugate plane 50. In addition, the disposition of the reduction optical system 51 makes it possible to make the size of the imaging device 22 smaller than the size of the light valve 21 while the imaging device 22 is disposed at the optically conjugate position with the light valve 21.

The bandpass filter 52 is provided to separate the image projection illumination light 41 from the position detection illumination light 42 and the image recognition illumination light 43. For example, as illustrated in FIG. 5, the bandpass filter 52 has a transmission characteristic of suppressing the image projection illumination light 41 and transmitting the respective center bands of the position detection illumination light 42 and the image recognition illumination light 43.

Light whose image is formed on the imaging device 22 is weak and it is thus important to insert the bandpass filter 52 for the purpose of preventing a signal from being saturated in a case of image recognition and position detection. If the bandpass filter 52 has a characteristic of transmitting a near-infrared region and suppressing visible light and infrared light other than near-infrared light as its characteristic, it is possible to achieve both the function as a projector and the functions of position detection and image recognition. The bandpass filter 52 suppresses light that is unnecessary for position detection and image recognition. This makes it possible to lead position detection light (the scattered light La of the position detection illumination light 42) and image recognition light (the image recognition illumination light 43) onto the imaging device 22 as pieces of signal light. This makes it possible to obtain clear image information with a favorable S/N ratio on the imaging device 22. With the condition of this characteristic, as described above, it is desirable that the respective center wavelengths of the position detection illumination light 42 and the image recognition illumination light 43 be substantially the same wavelength band.

For example, as illustrated in FIG. 4, the polarization separation device 23 is a polarized beam splitter having four optical surfaces. Here, description is given by referring to two surfaces opposed to each other in the horizontal direction in FIG. 4 as first optical surface and third optical surface and referring to two surfaces opposed to each other in the vertical direction as second optical surface and fourth optical surface. As illustrated in FIG. 4, the image projection illumination light 41 from the image projection illumination unit 1 enters the first optical surface. The light valve 21 is disposed on the second optical surface side of the polarization separation device 23. The imaging unit 5 is disposed on the third optical surface side of the polarization separation device 23. The projection optical system 4 is disposed on the fourth optical surface side of the polarization separation device 23.

The polarization separation device 23 separates incident light into a first polarized component (e.g., S-polarized component) and a second polarized component (e.g., P-polarized component) and outputs the respective polarized components in directions different from each other. The polarization separation device 23 selectively reflects the specific first polarized component and selectively transmits the specific second polarized component. The polarization separation device 23 reflects the first polarized component included in the image projection illumination light 41 that enters the first optical surface toward the light valve 21. The light that is modulated by the light valve 21 as the second polarized component is outputted from the fourth optical surface of the polarization separation device 23 and enters the projection optical system 4 as the image light 44.

In addition, the scattered light La of the position detection illumination light 42 and the image recognition illumination light 43 enter the fourth optical surface of the polarization separation device 23 via the projection optical system 4. The polarization separation device 23 reflects the respective first polarized components included in the scattered light La of the position detection illumination light 42 and the image recognition illumination light 43 toward the imaging unit 5 via the third optical surface.

1.2 Operation (Regarding Image Recognition)

FIG. 6 schematically illustrates an example of an imaging result of the image recognition object 72 by the imaging unit 5.

The imaging result illustrated in FIG. 6 schematically indicates an example of an imaging result of the image recognition object 72 in a case of the image recognition mode while the image light 44 is projected. The image recognition mode here is a state in which the image recognition illumination is on and the position detection illumination is off.

The above-described configuration allows the imaging device 22 to image information regarding the image recognition object 72 disposed in the projection area 31 as information regarding luminance obtained by being illuminated with the image recognition illumination light 43 as in FIG. 6 without being affected by image information regarding the image light 44 projected onto the projection surface 30. The detection image processing unit 6 performs image processing on a detection signal from the imaging device 22 and performs individual recognition on the image recognition object 72. In a case where the image recognition object 72 is a card, CD, or the like, the detection image processing unit 6 performs individual recognition on the image recognition object 72 by recognizing a feature point such as a picture printed on its surface. The detection image processing unit 6 feeds back information relevant to the recognized image recognition object 72 to the display control unit 8. The display control unit 8 supplies the light valve 21 with image data including the information relevant to the recognized image recognition object 72. This makes it possible to project the information relevant to the recognized image recognition object 72 as an image.

FIG. 6 schematically illustrates an image of the image recognition object 72 captured by the imaging device 22, but the image captured by the imaging device 22 scarcely has trapezoidal distortion or a position gap as can be seen from FIG. 6. In a case of an image captured by a camera provided as a different entity from the display apparatus with the detection function, a position gap is likely to occur. In addition, the projection style (imaging style) is different from that of the display apparatus with the detection function according to the first embodiment. The camera's angle of view or a mismatch image relationship with an object easily produces trapezoidal distortion. In the configuration of the display apparatus with the detection function according to the first embodiment, the projection optical system 4 is disposed on a light path from the image recognition object 72 to the imaging device 22 and an optical system for image recognition is partially shared with an optical system for image projection. This suppresses the occurrence of trapezoidal distortion or a position gap. To suppress the occurrence of trapezoidal distortion or a position gap, it is desirable that the ultra-short focus projection lens 24 be used for the projection optical system 4.

(Regarding Position Detection)

FIG. 7 schematically illustrates an example of an imaging result of the position detection object 71 by the imaging unit 5. The imaging result illustrated in FIG. 7 schematically indicates an example of an imaging result of the position detection object 71 in a case of the position detection mode while the image light 44 is projected. The position detection mode here is a state in which the image recognition illumination is off and the position detection illumination is on.

The display apparatus with the detection function according to the first embodiment has the function of not only image recognition, but also the function of position detection. It is possible to achieve a touch interaction function in accordance with an intuitive operation on a tablet terminal or the like. This allows a user to perform a more natural operation and have an image experience intended by an image provider side.

As illustrated in FIGS. 1 and 3, the position detection illumination unit 2 outputs the position detection illumination light 42 from the lower portion of the main body 100. The position detection illumination light 42 is diffused at a wide angle to cover at least the projection area 31 of the image light 44 on the projection surface 30 from a predetermined height. This causes at least the projection area 31 on the projection surface 30 to be covered with the near-infrared light barrier of the position detection illumination light 42 from the predetermined height. The projection area 31 covered with such a near-infrared light barrier prevents the position detection illumination light 42 from being diffused in a case where no instruction is issued by using the position detection object 71 such as a finger. In contrast, in a case where a finger or the like points at the projection area 31, this blocks the near-infrared light barrier. This generates the scattered light La of the position detection illumination light 42 obtained by the position detection illumination light 42 hitting against the finger or the like. This scattered light La of the position detection illumination light 42 enters the imaging device 22 via the projection optical system 4 and the polarization separation device 23 as with the case of image recognition described above. Here, the imaging device 22 and the projection surface 30 are disposed at positions having a relationship of optical conjugation. There is thus a one-to-one relationship between an image projection position and a position at which the finger or the like points. It is thus possible to identify the position (coordinates) at which the finger or the like points on the projection surface 30 in a case where the detection image processing unit 6 analyzes a detection signal based on an imaging result of the imaging device 22. The detection image processing unit 6 feeds back the identified positional information to the display control unit 8 to reflect the positional information in image data to be projected. This allows a user to operate an image by using a finger or the like as a role like a mouse pointer.

In a case where the detection image processing unit 6 identifies a position at which a finger or the like points, it is possible to extract a position signal separated from a noise component, for example, by providing an appropriate threshold and binarizing a detection signal. However, in the display apparatus with the detection function according to the first embodiment, the respective center wavelengths of the position detection illumination light 42 and the image recognition illumination light 43 are substantially the same. If the projection surface 30 is illuminated with the image recognition illumination light 43, the noise level thus becomes extremely high and it is difficult to extract the position signal. Therefore, it is desirable in the position detection mode to turn off the image recognition illumination light 43 at an appropriate timing.

(Relationship Between Height of Position Detection Illumination Light 42 and Height of Image Recognition Object 72)

As described above, the position detection illumination unit 2 outputs the position detection illumination light 42 to the projection surface 30 from the predetermined height. In this case, it is desirable that the position detection illumination unit 2 output, as the position detection illumination light 42, light substantially parallel to the projection surface 30 from a position higher than the height of a predetermined number of image recognition objects 72 stacked on top of another on the projection surface 30.

As described above, in a case where the display apparatus with the detection function according to the present embodiment detects the position detection object 71 such as a finger, the display apparatus with the detection function according to the present embodiment detects the scattered light La generated in a case where the near-infrared light barrier formed by the position detection illumination light 42 is blocked by the finger or the like. Therefore, in a case where the finger or the like does not point near the projection surface 30, it is desirable to set a state where the scattered light La is not generated. Accordingly, if the height of the position detection illumination light 42 with respect to the projection surface 30 is too low, the scattered light La is generated by the image recognition object 72 disposed on the projection surface 30. It is therefore desirable to output the position detection illumination light 42 from a height that prevents the image recognition object 72 from generating the scattered light La.

It is to be noted that the above-described predetermined number is desirably set at a number corresponding to the assumed image recognition object 72. For example, in a case where the apparatus according to the present embodiment is applied to a card game, the image recognition object 72 is a card. In that case, a plurality of cards may be used in a stacked form. In this case, the predetermined number may be more than one. In addition, in a case where the image recognition object 72 is a package medium such as CD or DVD, media do not have to be used normally in a stacked form. In this case, the predetermined number may be one.

(Regarding Diffusion Angle of Image Recognition Illumination Light 43)

It is desirable that an output diffusion angle $\theta 2$ of the image recognition illumination light 43 be greater than an output diffusion angle $\theta 1$ of the position detection illumination light 42 as illustrated in FIG. 3. In addition, it is desirable that the output diffusion angle $\theta 2$ of the image recognition illumination light 43 be ten times or more as great as the output diffusion angle $\theta 1$ of the position detection illumination light 42. It is to be noted that each of the output diffusion angles $\theta 1$ and $\theta 2$ referred to here is a diffusion angle in the direction vertical to the projection surface 30.

For example, the output diffusion angle $\theta 1$ of the position detection illumination light 42 may be 2° or less. In addition, the output diffusion angle $\theta 2$ of the image recognition illumination light 43 may be 30° or more, although it depends on the size of the projection area 31.

(Output Positions of Respective Pieces of Illumination Light)

It is desirable that an output position P3 of the image recognition illumination light 43 in the image recognition illumination unit 3 be farther from the projection surface 30 than an output position P2 of the position detection illumination light 42 in the position detection illumination unit 2 as illustrated in FIG. 3.

In addition, it is desirable that an output position P1 of the image light 44 in the projection optical system 4 be farther from the projection surface 30 than the output position P2 of the position detection illumination light 42 in the position detection illumination unit 2 as illustrated in FIG. 3. In addition, it is desirable that the output position P3 of the image recognition illumination light 43 in the image recognition illumination unit 3 be farther from the projection surface 30 than the output position P1 of the image light 44 in the projection optical system 4 as illustrated in FIG. 3.

(Regarding Determination of Switching Between Position Detection Illumination Light 42 and Image Recognition Illumination Light 43)

FIG. 8 illustrates an example of an exposure timing of the imaging device 22 having a rolling shutter method. FIG. 9 schematically illustrates an example of a captured image in the switching between the position detection illumination light and the image recognition illumination light in a case where imaging is performed in the rolling shutter method.

The display apparatus with the detection function according to the first embodiment switches, for example, between the image recognition mode and the position detection mode at predetermined timings to alternately perform image recognition and position detection in a time division manner. In this case, high-speed modes switching allows the display apparatus with the detection function according to the first embodiment to perform position detection and image recognition at substantially the same timing. However, especially in a case where the imaging device 22 is a CMOS sensor or the like that performs imaging in a rolling shutter method in the imaging unit 5, illumination light switching causes an image as illustrated in FIG. 9.

In FIG. 8, VD represents the timing of a vertical synchronization signal. FIG. 8 illustrates an example of an exposure timing for each of the horizontal pixel lines of the imaging device 22. In the rolling shutter method, each horizontal pixel line has a different exposure timing as illustrated in FIG. 8. Pixel data is subjected to data transfer for each of the horizontal pixel lines. Even illumination light switching at any timing therefore causes an image in which an image having the illumination light to be switched and an image having the illumination light after switching are mixed.

For example, in a case where the image recognition illumination light 43 is switched to the position detection illumination light 42, a captured image as illustrated in FIG. 6 is ideally obtained before the switching. A captured image as illustrated in FIG. 7 is ideally obtained after the switching. However, immediately after the switching, a captured image is actually obtained as illustrated in FIG. 9 in which the image having the illumination light before the switching and the image having the illumination light after the switching are mixed. Determining an image in which these two pieces of illumination light are mixed thus makes it possible to determine the end timing of the illumination light switching. An image acquired after the image in which the two pieces of illumination light are mixed is an image with the illumination light switching completed.

FIG. 10 illustrates an example of a histogram of the luminance distribution of a captured image in the position detection mode with illumination with only the position detection illumination light 42 as illustrated in FIG. 7. FIG. 11 illustrates an example of a histogram of the luminance distribution of a captured image in the image recognition mode with illumination with only the image recognition illumination light 43 as illustrated in FIG. 6. In each of FIGS. 10 and 11, the horizontal axis indicates luminance and the vertical axis indicates the number of pixels.

As illustrated in FIG. 10, the histogram of the luminance distribution of the captured image in the position detection mode indicates that the luminance distribution leans to the dark side. Conversely, as illustrated in FIG. 11, the histogram of the luminance distribution of the captured image in the image recognition mode indicates that the luminance distribution leans to the bright side. This indicates that an image as illustrated in FIG. 9 in the middle of illumination light switching is acquired in a case where there is a considerable different between the luminance of the upper portion and the luminance of the lower portion of the acquired image. Accordingly, it is apparent that an image to be acquired next is an image after the illumination light switching.

What has been described above allows the detection image processing unit 6 to determine the switching between the position detection illumination light 42 and the image recognition illumination light 43 on the basis of a histogram of the luminance distribution of a captured image.

The detection image processing unit 6 is configured to determine the switching between the position detection illumination light 42 and the image recognition illumination light 43, for example, on the basis of at least luminance information regarding the pixels for one upper line and luminance information regarding the pixels for one lower line of the captured image. As described above, a captured image as illustrated in FIG. 9 in which the two pieces of illumination light are mixed has a considerable difference between the luminance of the upper portion and the luminance of the lower portion of the image. It is therefore possible to determine the illumination light switching, for example, on the basis of the luminance of the pixels for the one uppermost line and the luminance of the pixels for the one lowermost line.

In addition, the detection image processing unit 6 may determine the switching between the position detection illumination light 42 and the image recognition illumination light 43, for example, on the basis of luminance information regarding all the pixels of a captured image. As illustrated in FIGS. 10 and 11, the luminance distribution of a captured image in the position detection mode and the luminance distribution of a captured image in the image recognition mode are different as a whole. This makes it possible to determine the illumination light switching on the basis of the luminance information regarding all the pixels.

In addition, the detection image processing unit 6 may determine the switching between the position detection illumination light 42 and the image recognition illumination light 43, for example, on the basis of any one of luminance information regarding the pixels for one upper line and luminance information regarding the pixels for one lower line of the captured image. For example, if it is known in advance as the specifications of the imaging device 22 whether pixel data switching starts from the upper side or the lower side, simply checking the luminance distribution of the pixels for the one upper line or lower line at which the pixel data switching ends makes it possible to determine the illumination light switching.

(Regarding Respective Illumination Periods of Position Detection Illumination Light 42 and Image Recognition Illumination Light 43)

As described below, it is desirable that the illumination control unit 7 control the position detection illumination unit 2 and the image recognition illumination unit 3 to cause the illumination period of the position detection illumination light 42 to be longer than the illumination period of the image recognition illumination light 43. In addition, it is desirable that the illumination control unit 7 control the position detection illumination unit 2 to cause the position detection illumination light 42 to be outputted over the period of at least three frames.

FIG. 12 is a timing chart illustrating an example of the timing of the switching between the position detection illumination light 42 and the image recognition illumination light 43. The upper portion of FIG. 12 illustrates an example in which the illumination period of the position detection illumination light 42 is longer than the illumination period of the image recognition illumination light 43. The upper portion of FIG. 12 illustrates, as an example, an example in which the proportion between the illumination period of the position detection illumination light 42 and the illumination period of the image recognition illumination light 43 is 8:2 in terms of the number of frames. In the example of the upper portion of FIG. 12, the lower portion of FIG. 12 illustrates an example in which the illumination period of the position detection illumination light 42 and the illumination period of the image recognition illumination light 43 are the same. The lower portion of FIG. 12 illustrates an example in which the proportion between the illumination period of the position detection illumination light 42 and the illumination period of the image recognition illumination light 43 is 2:2 in terms of the number of frames.

As described above, an image as illustrated in FIG. 9 in which two pieces of illumination light are mixed is acquired at the timing immediately after illumination light switching. This image serves as a sacrificed frame that is unusable as an image for position detection or image recognition as illustrated in FIG. 12. Here, as characteristics of the image recognition mode and the position detection mode, the image recognition mode has the feature that the real time property is not lost even if images are not frequently recognized. In contrast, the position detection mode requests a considerable real time property for position detection on a moving finger or the like. It is therefore preferable to decrease as many periods as possible in which detection is not possible.

This makes it possible to increase the real time properties of both the position detection and the image recognition by allocating fewer frames in the image recognition mode as compared with the number of frames of images acquirable per second and allocating more frames in the position detection mode. If an illumination period in the position detection mode continuously occupies three frames or more as in the example of the upper portion of FIG. 12 in that case, it is possible to decrease the number of times illumination switching is performed within a unit time. This makes it possible to decrease the number of times images before and after switching are mixed due to the rolling shutter characteristic. As in the example of the lower portion of FIG. 12, it is to increase the number of frames of effective images acquirable within a unit time as compared with a case where images for position detection and images for image recognition are acquired in the same proportion.

It is to be noted that, in a case where the illumination period of the position detection illumination light 42 is too long, the real time property of image recognition decreases. It is therefore preferable that the continuous illumination period of the position detection illumination light 42 be, for example, 0.5 seconds or less. In a case where the number of imaging frames per second is 30 frames, it is preferable that the continuous illumination period of the position detection illumination light 42 be, for example, 12 frames or less.

1.3 Effects

As described above, the display apparatus with the detection function according to the first embodiment allows the real time properties of position detection and image recognition to increase without causing the use of two imaging devices to complicate or enlarge the apparatus and without reducing the resolution of a captured image to ½.

It is to be noted that the effects described in this specification are merely illustrative and non-limiting. In addition, there may be any other effect. The same applies to the effects of the following other embodiments.

2. Other Embodiments

The technology according to the present disclosure is not limited to the description of the embodiment described above. The technology according to the present disclosure may be modified and implemented in a variety of ways.

For example, in the first embodiment described above, the case has been described where the image processing apparatus according to the present technology is applied to a projector serving as the display apparatus with the detection function. The image processing apparatus according to the present technology is also applicable to a display apparatus other than a projector. In addition, the image processing apparatus according to the present technology is also applicable to an apparatus that does not have a function of displaying an image.

For example, the present technology may also have configurations as follows.

The present technology having the following configurations makes it possible to increase the real time properties of position detection and image recognition.

(1)

An image processing apparatus including:

a position detection illumination unit that outputs position detection illumination light, the position detection illumination light being used for position detection on a position detection object;

an image recognition illumination unit that outputs image recognition illumination light, the image recognition illumination light being used for image recognition on an image recognition object;

an illumination control unit that controls the position detection illumination unit and the image recognition illumination unit to cause the position detection illumination light and the image recognition illumination light to be outputted at timings different from each other;

an imaging unit that the position detection illumination light and the image recognition illumination light enter at timings different from each other; and an image processing unit that determines switching between the position detection illumination light and the image recognition illumination light on the basis of luminance information regarding a captured image by the imaging unit, the image processing unit performing position detection on the position detection object on the basis of an imaging result of the imaging unit with the position detection illumination light switched on and performing image recognition on the image recognition object on the basis of an imaging result of the imaging unit with the image recognition illumination light switched on.

(2)

The image processing apparatus according to (1), in which the image processing unit determines the switching between the position detection illumination light and the image recognition illumination light on the basis of a histogram of luminance distribution of the captured image.

(3)

The image processing apparatus according to (1) or (2), in which the image processing unit determines the switching between the position detection illumination light and the image recognition illumination light on the basis of at least luminance information regarding pixels for one upper line and luminance information regarding pixels for one lower line of the captured image.

(4)

The image processing apparatus according to any one of (1) to (3), in which the image processing unit determines the switching between the position detection illumination light and the image recognition illumination light on the basis of luminance information regarding all pixels of the captured image.

(5)

The image processing apparatus according to (1) or (2), in which the image processing unit determines the switching between the position detection illumination light and the image recognition illumination light on the basis of any of luminance information regarding pixels for one upper line and luminance information regarding pixels for one lower line of the captured image.

(6)

The image processing apparatus according to any one of (1) to (5), in which the illumination control unit controls the position detection illumination unit and the image recognition illumination unit to cause an illumination period of the position detection illumination light to be longer than an illumination period of the image recognition illumination light.

(7)

The image processing apparatus according to (6), in which the illumination control unit controls the position detection illumination unit to cause the position detection illumination light to be outputted over a period of at least three frames.

(8)

The image processing apparatus according to any one of (1) to (7), in which the imaging unit performs imaging in a rolling shutter method.

(9)

A display apparatus with a detection function, the display apparatus including:

an image projection illumination unit that outputs image projection illumination light;

a light valve that modulates the image projection illumination light on the basis of image data and generates image light;

a position detection illumination unit that outputs position detection illumination light, the position detection illumination light being used for position detection on a position detection object;

an image recognition illumination unit that outputs image recognition illumination light, the image recognition illumination light being used for image recognition on an image recognition object;

an illumination control unit that controls the position detection illumination unit and the image recognition illumination unit to cause the position detection illumination light and the image recognition illumination light to be outputted at timings different from each other;

an imaging unit that the position detection illumination light and the image recognition illumination light enter at timings different from each other; and an image processing unit that determines switching between the position detection illumination light and the image recognition illumination light on the basis of luminance information regarding a captured image by the imaging unit, the image processing unit performing position detection on the position detection object on the basis of an imaging result of the imaging unit with the position detection illumination light switched on and performing image recognition on the image recognition object on the basis of an imaging result of the imaging unit with the image recognition illumination light switched on.

(10)

The display apparatus with the detection function according to (9), further including a projection optical system that projects the image light onto a projection surface.

This application claims the priority on the basis of Japanese Patent Application No. 2018-237899 filed on Dec. 20, 2018 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An image processing apparatus, comprising:
   a position detection illumination unit that outputs position detection illumination light, the position detection illumination light being used for position detection on a position detection object;
   an image recognition illumination unit that outputs image recognition illumination light, the image recognition illumination light being used for image recognition on an image recognition object;
   an illumination control unit that controls the position detection illumination unit and the image recognition illumination unit to cause the position detection illumination light and the image recognition illumination light to be outputted at timings different from each other;
   an imaging unit that the position detection illumination light and the image recognition illumination light enter at timings different from each other; and
   an image processing unit that determines switching between the position detection illumination light and the image recognition illumination light on a basis of luminance information regarding a captured image by the imaging unit, the image processing unit performing position detection on the position detection object on a basis of an imaging result of the imaging unit with the position detection illumination light switched on and performing image recognition on the image recognition object on a basis of an imaging result of the imaging unit with the image recognition illumination light switched on.

2. The image processing apparatus according to claim 1, wherein the image processing unit determines the switching between the position detection illumination light and the image recognition illumination light on a basis of a histogram of luminance distribution of the captured image.

3. The image processing apparatus according to claim 1, wherein the image processing unit determines the switching between the position detection illumination light and the image recognition illumination light on a basis of at least luminance information regarding pixels for one upper line and luminance information regarding pixels for one lower line of the captured image.

4. The image processing apparatus according to claim 1, wherein the image processing unit determines the switching between the position detection illumination light and the image recognition illumination light on a basis of luminance information regarding all pixels of the captured image.

5. The image processing apparatus according to claim 1, wherein the image processing unit determines the switching between the position detection illumination light and the image recognition illumination light on a basis of any of luminance information regarding pixels for one upper line and luminance information regarding pixels for one lower line of the captured image.

6. The image processing apparatus according to claim 1, wherein the illumination control unit controls the position detection illumination unit and the image recognition illumination unit to cause an illumination period of the position detection illumination light to be longer than an illumination period of the image recognition illumination light.

7. The image processing apparatus according to claim 6, wherein the illumination control unit controls the position detection illumination unit to cause the position detection illumination light to be outputted over a period of at least three frames.

8. The image processing apparatus according to claim 1, wherein the imaging unit performs imaging in a rolling shutter method.

9. A display apparatus with a detection function, the display apparatus comprising:
   an image projection illumination unit that outputs image projection illumination light;
   a light valve that modulates the image projection illumination light on a basis of image data and generates image light;
   a position detection illumination unit that outputs position detection illumination light, the position detection illumination light being used for position detection on a position detection object;
   an image recognition illumination unit that outputs image recognition illumination light, the image recognition illumination light being used for image recognition on an image recognition object;
   an illumination control unit that controls the position detection illumination unit and the image recognition illumination unit to cause the position detection illumination light and the image recognition illumination light to be outputted at timings different from each other;

an imaging unit that the position detection illumination light and the image recognition illumination light enter at timings different from each other; and an image processing unit that determines switching between the position detection illumination light and the image recognition illumination light on a basis of luminance information regarding a captured image by the imaging unit, the image processing unit performing position detection on the position detection object on a basis of an imaging result of the imaging unit with the position detection illumination light switched on and performing image recognition on the image recognition object on a basis of an imaging result of the imaging unit with the image recognition illumination light switched on.

10. The display apparatus with the detection function according to claim 9, further comprising a projection optical system that projects the image light onto a projection surface.

\* \* \* \* \*